United States Patent [19]

Manison

[11] Patent Number: 5,459,695
[45] Date of Patent: Oct. 17, 1995

[54] SEISMIC CABLE WITH REUSABLE SKIN

[75] Inventor: Ronald G. Manison, Sugar Land, Tex.

[73] Assignee: Western Atlas International, Houston, Tex.

[21] Appl. No.: 938,408

[22] Filed: Aug. 31, 1992

[51] Int. Cl.[6] .................... B63B 21/00; H02G 15/113; G01V 1/38
[52] U.S. Cl. .............. 367/18; 367/166; 324/365; 174/101.5
[58] Field of Search .................... 367/15, 18, 166, 367/171, 165, 167, 173, 177; 181/110, 112; 324/365; 174/101.5

[56] References Cited

U.S. PATENT DOCUMENTS

| 3,650,009 | 3/1972 | Ausnit et al. | 29/235 |
|---|---|---|---|
| 3,794,965 | 2/1974 | Charske | 367/18 |
| 3,795,759 | 3/1974 | Rhyne | 174/101.5 |
| 3,836,694 | 9/1974 | Kapell | 174/22 |
| 3,909,774 | 9/1975 | Pavey | 367/173 |
| 4,117,259 | 9/1978 | Giebel et al. | 174/92 |
| 4,491,939 | 1/1985 | Carpenter | 367/166 |
| 4,496,796 | 1/1985 | Matikainen et al. | 174/101.5 |
| 4,692,564 | 9/1987 | Campbell et al. | 174/92 |
| 4,745,583 | 5/1988 | Motal | 367/18 |
| 5,251,373 | 10/1993 | DeCarlo et al. | 29/870 |
| 5,341,348 | 8/1994 | Farris | 367/154 |

Primary Examiner—Nelson Moskowitz
Attorney, Agent, or Firm—Fish & Richardson

[57] ABSTRACT

A seismic cable segment is provided having a longitudinal seam for access into the seismic cable, a cable skin lock, a flotation tube for varying the buoyancy of the seismic cable, external stress members isolated from the inside of the seismic cable, and an environmentally safe gel filling the seismic cable.

25 Claims, 4 Drawing Sheets

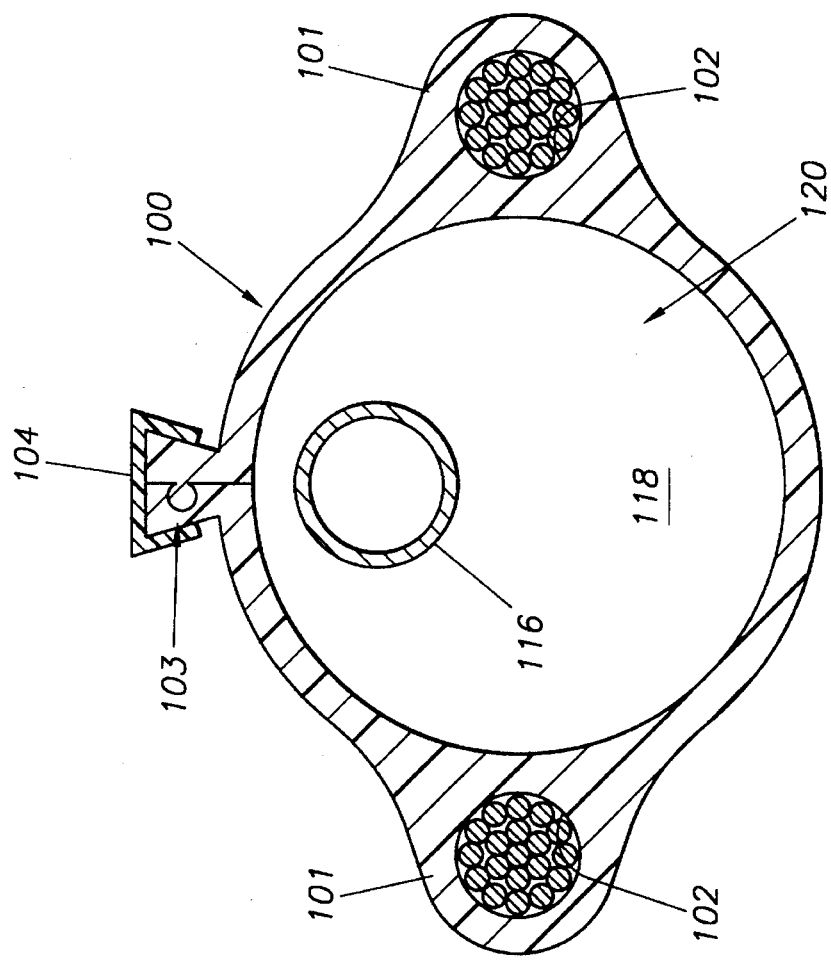
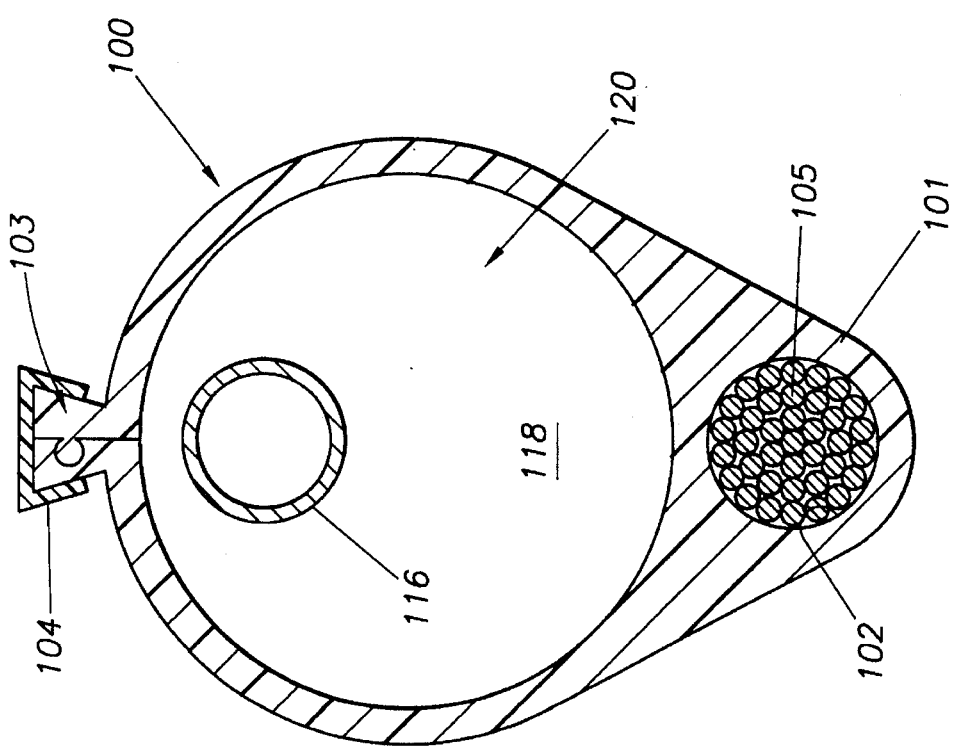

SEISMIC CABLE WITH REUSABLE SKIN

BACKGROUND OF THE INVENTION

FIELD OF THE INVENTION

The present invention relates generally to the field of seismic exploration, and more particularly to an improved towable, seismic cable segment with reusable skin, flotation tube and external stress member.

DESCRIPTION OF THE RELATED ART

It is common in the oil and gas exploration industry to utilize towed seismic or streamer cables behind a vessel in a body of water in order to obtain geophysical information relating to substrata below the water. A seismic cable is generally assembled from a plurality seismic cable segments, typically 100 meters long. Conventional seismic cable segments have an outer skin of polyvinylchloride (PVC) or polyurethane. The cable segments typically include hydrophones, electronic components, electrical conductors, internal bulkheads, and multiple internal stress members, such as wire ropes. The cable segments are typically filled with kerosene, or other cable oil to provide a predetermined buoyancy.

Conventional seismic cables (cable segments) have much to commend their use; however, there are certain drawbacks and disadvantages incident to their present construction. For example, the kerosene or other light oil used to fill the seismic cable segments is flammable and can have detrimental effects on the environment. Cuts, tears, and other leaks often occur in the cable skin that allow the kerosene or other light oil to escape into and contaminate the ocean.

Repairing conventional seismic cables that have been damaged, especially during operation, can be very expensive and time consuming. This may require stopping surveying activities, pulling the seismic cable (about three kilometers long) on board to perform repairs. Such down time can cost several thousand dollars per hour. To repair a conventional seismic cable segment, the cable skin must be cut and removed from the cable, which is time consuming, results in the loss of the kerosene filler and the loss of the skin itself. Moreover, such repairs often must be conducted in land-based facilities, especially if there has been damage to the internal components of the cable. An additional problem is presented by the propensity of kerosene-filled cables to retain air which interferes with the acoustic transmission properties of the cable. Moreover, movement of the oil within the cable also interferes with the acoustic transmission properties of the cable.

Further, the multiple internal stress members of conventional seismic cables can cause physical damage to the sensitive electronic components within the seismic cable. Seismic cables are typically spooled on large reels aboard the vessel. Excessive bending of the seismic cable can cause the internal stress members to pinch, bind, or crush the internal electronic components. The present invention provides a seismic cable which overcomes these and other problems of conventional seismic cables.

SUMMARY OF THE INVENTION

The present invention provides a seismic cable segment having a cable skin with a longitudinal seam and a cable skin lock for sealing the seam in fluid-tight arrangement. A flotation tube is provided for receiving fluid from outside the cable skin for controlling the buoyancy of the cable. An external stress member is located in an annular region of the cable skin that is isolated from the main seismic cable chamber. A suitable gel is used for partially filling the inside of the seismic cable.

In another embodiment of the seismic cable of the present invention, a seismic cable skin is provided which contains a main chamber of substantially circular cross-section and a second chamber, isolated from the main chamber, for receiving an external stress member. The cable skin has a longitudinal seam for providing access to the main chamber. A skin lock is provided for sealing the longitudinal seam. A flotation tube is provided for receiving a fluid from outside the cable skin.

Examples of the more important features of the invention thus have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which the like elements have been given like numerals and wherein:

FIG. 2a shows an end view of a seismic cable made according to the present invention.

FIG. 2b shows an alternate embodiment of a seismic cable made according to the present invention.

DETAILED DESCRIPTION OF THE PREFERRED EMBODIMENT

Figure 1:
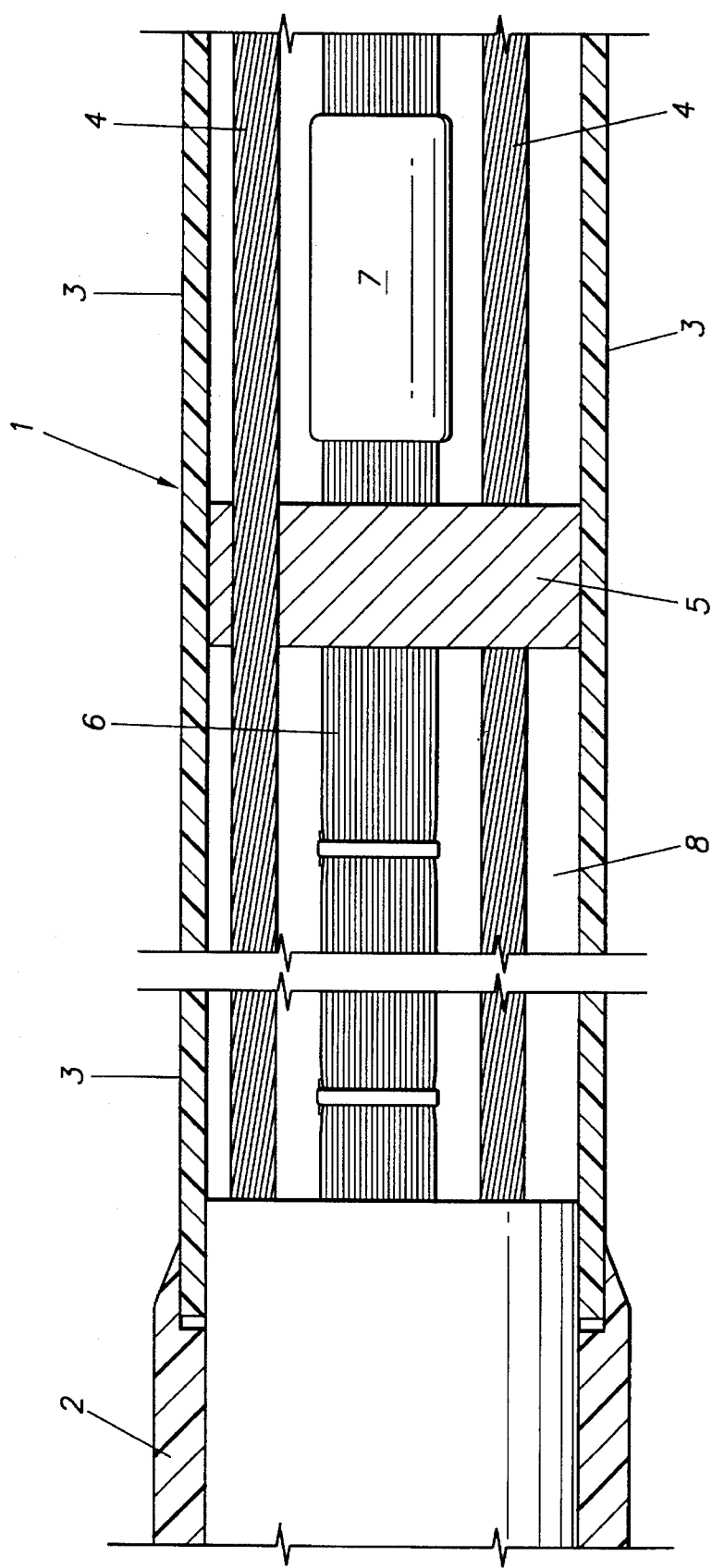
FIG. 1 shows a sectioned view of a typical, prior art seismic cable.

A typical, prior art towed seismic cable segment is illustrated in sectioned view in FIG. 1. The prior art seismic cable shown in FIG. 1 comprises an end coupling 2, annular or tubular cable skin 3, internal stress members 4, fixed bulkhead 5, and electronics 6. The electronics will typically includes digital electronic circuits, power supplies, fiber optic cables and hydrophone 7.

Most conventional seismic cables utilize a plurality of internal stress members 4. FIG. 1 shows a typical arrangement in which three internal stress members are placed longitudinally equispaced about the center line of the seismic cable. Conventional internal stress members are often in the form of wire ropes. The internal stress members 4 are securely fixed to end coupling 2 and they serve to absorb all of the tensile load associated with the service of a towed seismic cable.

As stated previously, conventional towed seismic cables are made up of individual cable segments of 100 meter lengths. Each 100 meter segment is substantially sealed against water and is filled with kerosene or other light oil. Bulkhead 5 is fixedly attached to the internal stress members such that its location along the length of the seismic cable is fixed. The bulkhead is substantially solid although it does have passageways therethrough to allow the electronics 6 to pass. There are also other passageways through the bulkhead 5 to provide the kerosene 8 a limited amount of fluid communication along the length of the seismic cable segment. The bulkheads 5 serve at least the following functions: to provide desired strength to the seismic cable; to maintain the generally circular cross-section of the seismic cable; to keep the internal stress members 4 from twisting or becoming entangled; and, to retard the movement of kerosene along the length of the seismic cable.

Conventional towed seismic cables which utilize kerosene (or other cable oil) are susceptible to trapped air which increases the ambient noise level of the seismic cable. An increase in ambient noise level decreases the acoustic properties of the cable (e.g., reduction in the effectiveness of hydrophones 7). Prior art solutions to the entrapped air problem have involved wrapping hydrophones 7 and other components with open cell foam (not shown). However, the use of open cell foam inhibits the movement of the oil inside the case.

It will be appreciated from the foregoing disclosure and from FIG. 1 that conventional towed seismic cables suffer from several disadvantages. Specifically, the kerosene 8 or other light oil with which the seismic cable 1 is filled is environmentally unsafe and inflammable. Further, any repair to the seismic cable 1 requires that cable skin 3 be cut and stripped away from the seismic cable 1. This may result in halting operation to repair the cable, and loss of kerosene 8 and a loss of skin 3. In addition, when seismic cable 1 is bent about a tight radius such as when spooled upon a reel, internal stress members 4 can damage the electronic components 6 and 7.

Some of the objects of the present invention are to provide a seismic cable segment that is smaller and lighter than conventional cables and yet that has a similar range of operation; a seismic cable segment that is easier to maintain and repair than conventional seismic cables; a seismic cable segment that may easily be repaired on-board; and a seismic cable segment that is less detrimental to the environment than conventional cables.

FIG. 2a shows an end view of a seismic cable made according to the present invention. Cable skin 100 is shown to have an elongated portion 101 that has a passageway 102 of substantially circular cross-section therethrough. Locking mechanism 103 and retainer clip 104 are also seen.

Elongated portion 101 (and therefore passageway 102) is integral with cable skin 100, but passageway 102 is separated from a main chamber 118. Passageway 102 is designed to accommodate external stress member 105, which in the preferred embodiment, is a stainless steel wire rope that is securely fixed at both ends with couplings (not shown). The cable skin 100 can be secured to external stress member 105, but this is not necessary and in the preferred embodiment, the cable skin 100 is able to slide over the outer surface of external stress member 105. FIG. 2b shows an alternate embodiment of the present invention wherein the cable skin 100 exhibits two elongated portions 101, each having a substantially circular passageway 102. Similarly, more than two external stress members may also be provided.

Passageways 102 allow the external stress member(s) 105 to be completely isolated from the electronics and electrical conductors 6 of the seismic cable. This isolation of electronics and stress members will greatly reduce the likelihood of damage to the sensitive electronic components or electrical conductors from the stress members. It is also felt that the use of one or more than one external stress members will greatly reduce the overall size and weight of each seismic cable segment.

Also shown in FIGS. 2a and 2b is a flotation tube 116, the function of which will be described in detail with reference to FIG. 4 below.

Whereas conventional seismic cables are filled with kerosene or other oil, the main chamber 118 of the present invention is filled with a suitable non-conductive gel 120 having desired buoyancy characteristics. Several non-conductive gels are presently available that are non-corrosive, lighter than water, and environmentally safer than kerosene and other conventional oils. The combination of a gel filler fluid 120 and flotation tube 116 eliminates the use of cable oil and lead weights to fine tune the buoyancy of a seismic cable. Further, the use of a gel as a filler fluid will likely reduce the ambient noise of the cable due to fluid movement and/or entrapper air. The use of a gel also restricts the movement of any water that may gain access to the main chamber 118 during use.

Figure 3A:
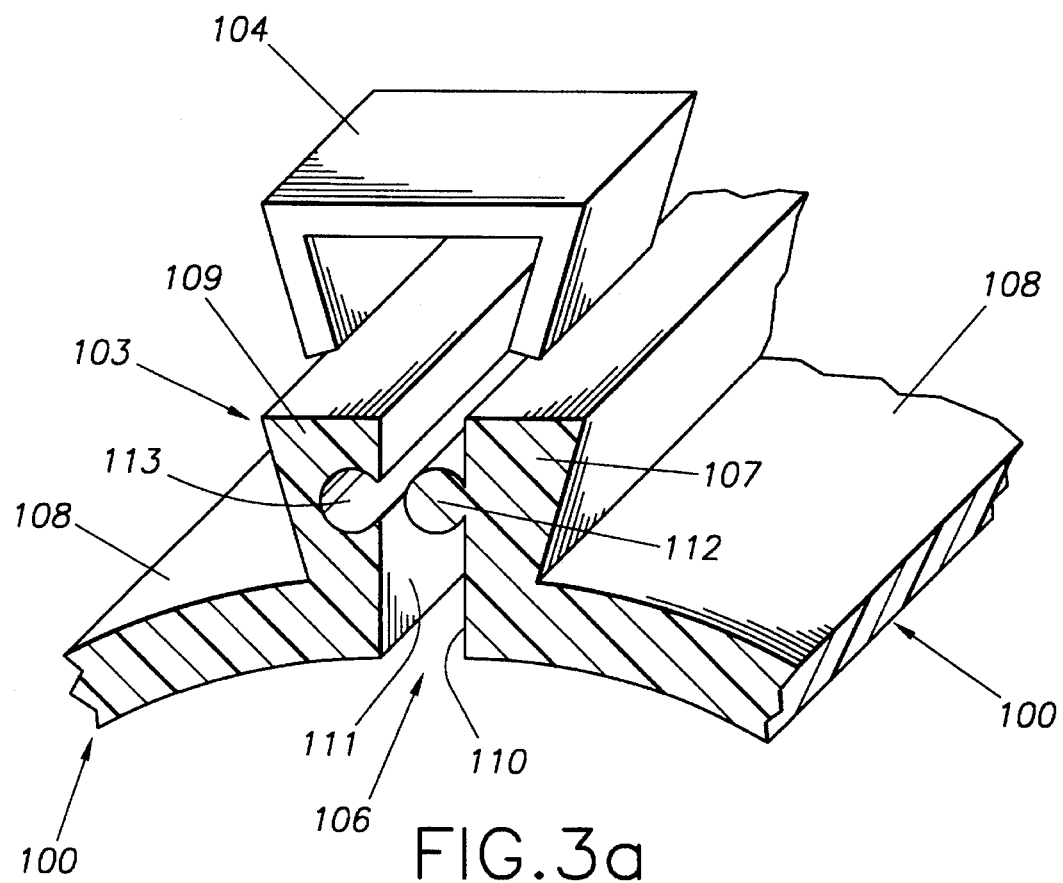
FIG. 3a shows a closeup of a cable skin lock according to the present invention.
Figure 3B:
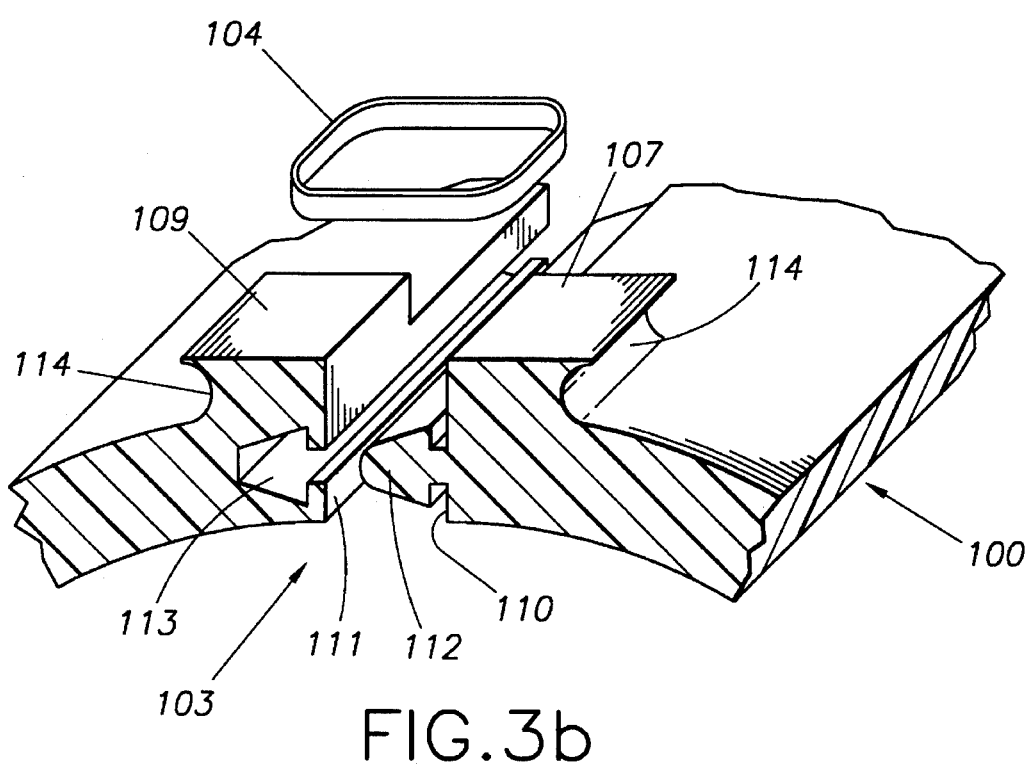
FIG. 3b shows an alternate embodiment of the cable skin lock made according to the present invention.

Cable skin lock 103 and retainer clip 104, also shown in FIGS. 2a and 2b will be discussed in more detail with reference to FIGS. 3a and 3b, FIG. 3a illustrating the presently preferred embodiment. As described previously, cable skin 100 is made from extruded PVC or polyurethane. The cable skin is not continuous in cross-section like conventional cable skins but instead has a longitudinal seam 106. The cable lock shown in FIG. 3a is adjacent longitudinal seam 106 and is formed as an integral part of cable skin 100. The cable lock 103 of the presently preferred embodiment comprises essentially five parts: 1) a male flange 107, 2) a tongue or locking tab on the male flange 112, 3) a female flange 109, 4) a groove or receiver on the female flange 113, and 5) a retainer clip 104.

Male flange 107 protrudes above nominal skin surface 108. In cross-section, male flange 107 is seen to be basically one-half of a dovetail. Female flange 109 is also shown to protrude above nominal skin surface 108. In cross-section, female flange 109 is also one-half of a dovetail. Male flange 107 has a seal face 110 and female flange 109 has a corresponding seal face 111. Seal faces 110 and 111 are oriented such that they both lie along a radial axis from the center line of the seismic cable so that seal faces 110 and 111 will maintain substantially complete contact across their height and length when they are brought into engagement.

Male flange 107 is also shown to include a tongue or locking tab 112. In the preferred embodiment, tongue 112 has a substantially circular cross-section and extends along sealing face 110 for the length of longitudinal seam 106. However, it will be appreciated by those of ordinary skill in the art having benefit of this disclosure that tongue tab 112 can also be discontinuous along the length 106 of the seismic cable.

Female flange 109 is shown to include a groove or receiver 113 for receiving tongue 112 of male flange 107. In the preferred embodiment, receiver 113 is substantially the same crosssectional shape as tongue 112. The resulting structure requires a moderate amount of force to insert tongue 112 into groove 113. Once tongue 112 is securely placed inside groove (as shown in FIGS. 2a or 2b), seal faces 110 and 111 contact each other to form a substantially water tight seal along the length of the longitudinal seam 106.

Retainer clip 104, is preferably made from a material that has high strength and high flexibility to hold the male flange 107 and female flange 109 together, which now form a complete dovetail. The retainer clip 104 does not need to be continuous along the length of the seismic cable segment. Typically, each segment of seismic cable made will utilize a plurality of retainer clips placed in spaced relation along the length of the cable segment. Retainer clips 104 are preferably as flexible as possible without comprising the sealing properties of lock 103 so that the cable segment can be freely bent.

FIG. 3b discloses an alternate form of the skin lock 103 made according to the present invention. This alternate embodiment also includes a tongue 112 formed in the shape of an arrowhead and a correspondingly-shaped groove 113. The alternate embodiment shown in FIG. 3b also includes a male flange 107 and a female flange 109. This alternate embodiment of the skin lock also requires a moderate amount of force to engage locking tab 112 with the receiver 113. Once this engagement has been completed, seal faces 110 and 111 are in sealing engagement.

In this embodiment, retainer clip 104 is typically an oval ring fabricated from stainless steel or other material. The retainer clip 104 has a major diameter that is smaller than the distance between flange recesses 114. This requires a special tool (not shown) to install the retainer clip 104 in the cable skin lock 103. Once the retainer clip 104 is in position, it functions to hold sealing faces 110 and 111 and tongue and groove (112 and 113, respectively) in sealing engagement.

The skin lock 103 can be periodically opened and re-locked in order to repair damage to the electronics or other structures within the seismic cable. Thus, the present invention overcomes the prior art problem of having to cut the cable skin from the seismic cable every time a repair to the components inside the cable is needed.

Figure 4:
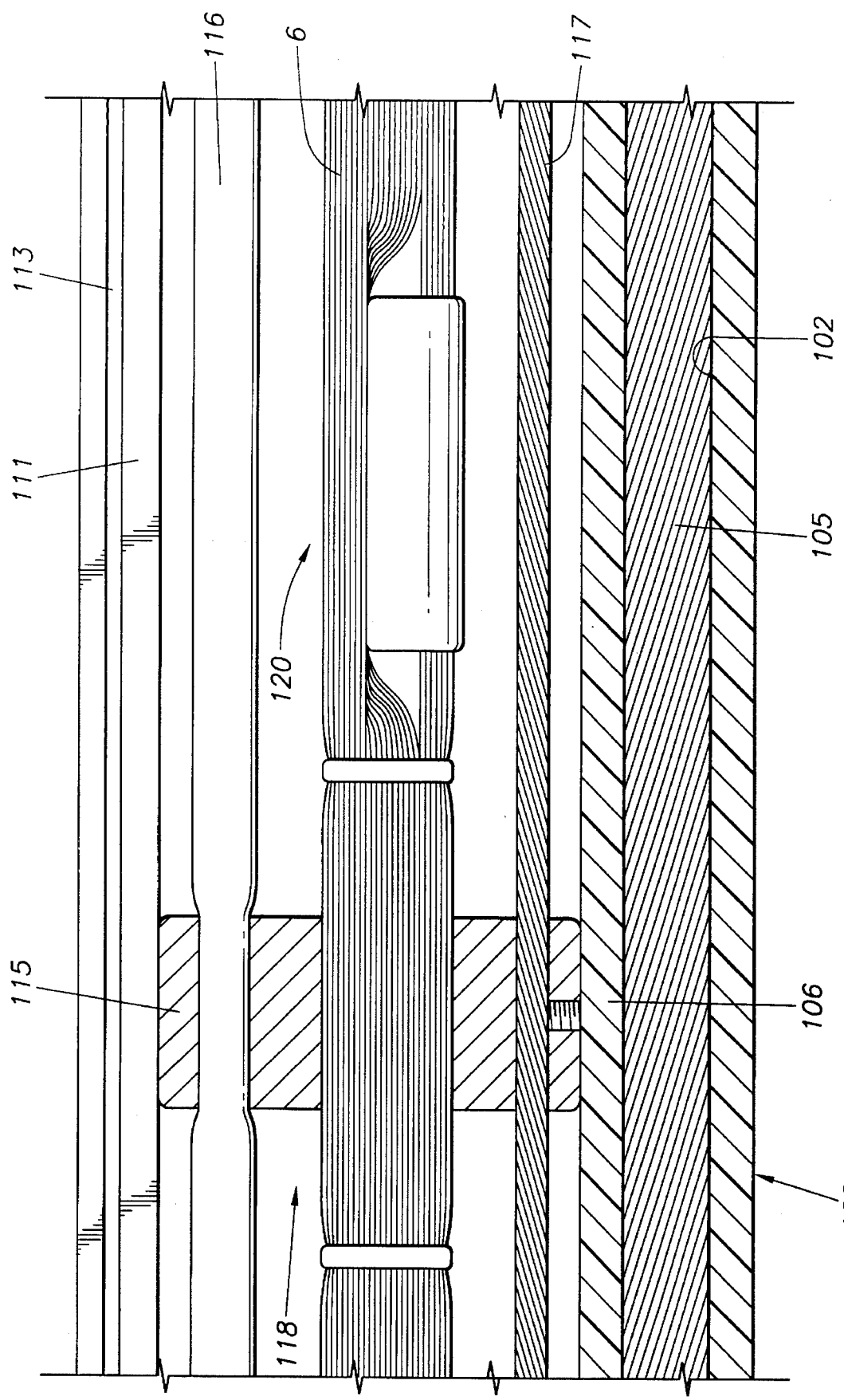
FIG. 4 shows a sectioned view of a seismic cable made according to the present invention.

FIG. 4 shows, in cross-section, a portion of a towed seismic cable segment made according to the present invention. The cable skin 100 (which is preferably extruded) has a passageway 102, a groove 113 and a seal face 11.1. A conventional bulkhead or any other suitable bulkhead 115 is disposed in the main chamber 118 of the seismic cable formed by the cable skin 100. As previously disclosed, bulkhead 115 has a plurality of openings to accommodate electronics 6 and to allow limited movement of the cable filler fluid 120.

Also shown in FIG. 4 is another aspect of the present invention. Flotation tube 116 is preferably fabricated from polyethylene, but may also be fabricated from an equivalent expandable material. The flotation tube runs the entire length of the seismic cable segment and, in the preferred embodiment as shown in FIG. 4, the flotation tube is located adjacent the cable skin lock 103. One end of the flotation tube 116 is sealed off and will typically (though not necessarily) be fixedly attached to one of the end couplings 2 (not shown) at the end of the seismic cable segment. At the other end of the seismic cable segment, flotation tube 116 will preferably terminate in the other end coupling (not shown) such that the flotation tube 116 communicates with the outside environment by way of a conventional non-return (or one-way) valve (not shown). Alternatively, the flotation tube 116 may communicate with the outside environment through a valve located in the cable skin 100.

As shown in FIG. 4, flotation tube 116 passes through an opening formed in bulkhead 115. In the preferred embodiment of the present invention, flotation tube 116 is securely fastened to bulkhead 115 to thereby fix the location of bulkhead 115 along the length of the seismic cable segment. Alternatively, a synthetic rope 117 can be used as a bulkhead positioner. In this alternate embodiment, the flotation tube 116 is not required to be fixedly attached to the bulkhead 115.

The one-way valve can be used to inflate the flotation tube 116 to various pressures thereby changing the buoyancy of the seismic cable segment to suit local conditions. It is preferred that air be used to inflate the flotation tube 116, however, other gases such as nitrogen or helium can also be used. Also, the flotation tube 116 may be positioned along the centerline of the seismic cable segment, or at another suitable location as dictated by particular applications.

The foregoing description is directed to particular embodiments of the invention for the purpose of illustration and explanation. It will be apparent, however, to one skilled in the art that many modifications and changes to the embodiments set forth above are possible without departing from the scope and the spirit of the invention. It is intended that the following claims be interpreted to embrace all such modifications and changes.

What is claimed is:

1. A seismic cable segment comprising:

an exterior, annular, elongated cable skin having a lengthwise seam therein;

an internal, elongated, inflatable flotation tube closed at one end having a means for receiving a fluid for varying the buoyancy of the seismic cable segment; and a reusable cable skin lock for sealing a lengthwise seam in said cable skin against fluid intrusion, said cable skin lock adapted to withstand towed seismic exploration.

2. The seismic cable segment of claim 1, further comprising a gel substantially filling the annulus of the cable skin.

3. A seismic cable segment comprising:

a cable skin having a lengthwise seam and a plurality of passageways along said length, a first passageway defining a main chamber of the seismic cable segment, and at least a second passageway for receiving a stress member;

a cable skin lock adjoining said lengthwise seam for sealing the main seismic cable chamber in fluid tight engagement, said cable skin lock capable of withstanding repeated towing during marine seismic exploration;

a flotation tube disposed along the length of the seismic cable and located in said main chamber, said flotation tube adapted to be pressurized from outside the seismic cable skin; and a stress member located in said second passageway for reacting stresses associated with ocean-based seismic operations.

4. The seismic cable segment of claim 3, wherein said cable skin is extruded polyvinylchloride.

5. The seismic cable segment of claim 3, wherein said cable skin is extruded polyurethane.

6. The seismic cable segment of claim 3, wherein said second passageway does not restrict the relative movement of said stress member.

7. The seismic cable segment of claim 3, wherein said second passageway restricts the movement of said stress member.

8. The seismic cable segment of claim 3, wherein said cable skin lock further comprises an interlocking tongue and groove extending the entire length of said seam, and a plurality of retainer clips for holding said tongue and groove in fluid fight engagement.

9. The seismic cable segment of claim 3, wherein said cable skin lock further comprises an interlocking tongue and groove discontinuous along the length of said seam, and a plurality of retainer clips for holding said tongue and groove in fluid tight engagement.

10. The seismic cable segment of claim 3, wherein said flotation tube is extruded polyurethane.

11. The seismic cable segment of claim 3 wherein said flotation tube is fixedly secured to a plurality of bulkheads within said main chamber of said seismic cable segment.

12. The seismic cable segment of claim 3, wherein said flotation tube has one end sealed against fluid leakage, and the other end terminating adjacent an end coupling of the seismic cable segment and connected to a one-way valve in said end coupling.

13. The seismic cable segment of claim 3, wherein said stress member is a wire rope secured to end couplings associated with the seismic cable segment.

14. The seismic cable segment of claim 3, further comprising an environmentally safe gel that fills the main chamber of the seismic chamber.

15. The seismic cable of claim 3, further comprising a third passageway for receiving a second stress member.

16. A seismic cable segment comprising:

a cable skin having a lengthwise seam and a plurality of passageways along said length, a first passageway defining a main chamber of the seismic cable, and a second passageway for receiving a stress member;

a cable skin lock adjacent said lengthwise seam for sealing the main seismic cable chamber in fluid tight engagement during towed marine seismic exploration, said lock comprising a tongue, a groove and a retainer clip;

a flotation tube disposed along the length of the seismic cable and located in said main chamber, one end of said tube sealed against fluid leakage, the other end of said tube adapted to be pressurized from outside the seismic cable skin;

stress member for providing desired tensile strength to the seismic cable segment, said stress member fixed at each end to coupling associated with said seismic cable segment; and gel filling said main chamber.

17. A seismic cable skin comprising:

an annular, elongated cable skin;

said cable skin having a lengthwise seam for providing access to the annulus of the seismic skin; and means integral with the cable skin for sealing the seam for establishing an essentially fluid-tight engagement, said sealing means adapted to maintain said engagement during towed seismic exploration.

18. The seismic cable skin of claim 17, wherein said flexible material is extruded polyvinylchloride.

19. The seismic cable skin of claim 17, wherein said flexible material is extruded polyurethane.

20. A seismic cable skin, comprising:

a first tube of flexible material having a substantially circular cross-section, the inside diameter surface of said first tube defining a first passageway for receiving seismographic instrumentation, said first tube having a longitudinal seam;

a second tube of said flexible material integral with said first tube but partitioned therefrom, having a substantially circular cross-section, the inside diameter surface of said second tube defining a second passageway for receiving a stress member; and a means for sealing the longitudinal seam of first tube in fluid fight engagement during towed seismic exploration.

21. The seismic cable skin of claim 20, wherein said flexible material is extruded polyurethane.

22. The seismic cable skin of claim 20, wherein said second tube does not restrict the relative movement of said stress member.

23. The seismic cable skin of claim 20, wherein said second tube restricts the relative movement of said stress member.

24. The seismic cable skin of claim 20, wherein said means for sealing is a tongue and groove structure extending the length of said seam.

25. The seismic cable skin of claim 20, wherein said means for sealing is a tongue and groove structure intermittent along the length of said seam.

* * * * *

UNITED STATES PATENT AND TRADEMARK OFFICE
CERTIFICATE OF CORRECTION

PATENT NO. : 5,459,695

DATED : October 17, 1995

INVENTOR(S) : Ronald G. Manison

It is certified that error appears in the above-identified patent and that said Letters Patent is hereby corrected as shown below:

Col. 5, line 37, replace "11.1" with --111.--

Col. 6, line 64, replace "fight" with --tight--.

Col. 7, line 38, change "coupling" to --couplings--.

Signed and Sealed this

Second Day of January, 1996

*Attest:*

BRUCE LEHMAN

*Attesting Officer*     *Commissioner of Patents and Trademarks*